United States Patent Office 3,179,641
Patented Apr. 20, 1965

3,179,641
VINYL ARYL STEARATES AND POLYMERS THEREOF
Louise H. Brown, Santa Monica, and Ronald Swidler, Pasadena, Calif., assignors, by mesne assignments, to Armour and Company, Chicago, Ill., a corporation of Delaware
No Drawing. Filed May 22, 1961, Ser. No. 111,498
25 Claims. (Cl. 260—87.1)

This invention relates to vinyl compounds and has particular reference to novel vinyl monomers and polymers.

A primary object of the present invention is to provide a novel class of vinyl compounds useful, inter alia, in the preparation of vinyl polymers and copolymers.

Another object of the present invention is to provide a novel class of vinyl polymers and copolymers useful in the production of films, molded plastics and the like.

A further object of this invention is to provide novel compounds constituting vinyl aryl stearates, and a process for producing the same.

A further object of this invention is to provide novel copolymers containing vinyl aryl stearates, such polymers having improved light stability properties.

Other objects and advantages of the present invention, it is believed, will be readily apparent from the following detailed description of preferred embodiments thereof.

Briefly, this invention comprehends within its scope the discovery of vinyl aryl stearate compounds. It has been further discovered that such compounds are copolymerizable with vinyl monomers to produce internally plasticized copolymers of improved light stability and, in some cases, having excellent "lazy elasticity" properties.

In producing the compounds and polymers of the present invention, the vinyl aryl stearates are synthesized by ester interchange between vinyl acetate and an aryl stearic acid such as, for example, phenyl stearic acid, naphthyl stearic acid, tolyl stearic acid, and the like. The aryl stearic acids are preferably produced by alkylation of an aromatic compound with oleic acid in the presence of an acid-activated clay.

Thus, vinyl phenylstearate is synthesized in ca. 50% yield from phenylstearic acid and vinyl acetate via ester interchange. The vinyl phenylstearate is readily copolymerized with vinyl chloride or vinyl acetate in an emulsion system. The vinyl chloride copolymers can contain from 1–34% or more of phenylstearate residues. Repeated fractionation of these polymeric materials fails to alter their compositions significantly, representing compelling evidence for a polymer rather than a physical mixture of homo-polymers.

Films cast from the vinyl chloride-vinyl phenylstearate copolymers exhibited good "hand" and flexibility. In the 9–25% phenylstearate range of composition these films possess an acceptable tensile strength of 1800–2200 p.s.i. and brittle points of −50 to −40° C. By comparison, externally plasticized polyvinyl chloride films have tensile strengths of 2000–2700 p.s.i. and brittle points of −60 to −47° C. The molecular weights of copolymers prepared in accordance with this invention generally range from 50–65,000 and higher. As the fat content of the polymers increased an increasing resistance to light degradation was noted.

Copolymerization of vinyl acetate with vinyl phenylstearate proceeds smoothly in ca. 50 hours at 50° C. to yield 80–100% yields of copolymer. The estimated molecular weight of these materials ranged from 120–150,000. The tensile strengths of these materials varied between 300–540 p.s.i. By comparison, a vinyl acetate-vinyl stearate copolymer exhibited a tensile strength of 1700. Experimental films from vinyl acetate copolymers are resistant to water logging. Moreover, those films which contain 6–9% or more phenylstearate residues were characterized by a "lazy elastic" property. Thus, when strips of film were stretched to 3–6 times their resting length they soon returned to their original dimensions (and more rapidly on warming). The plastic films were self-adhering. The characteristics of these vinyl acetate films suggest their use in acoustical materials and wrapping applications.

The following specific examples are illustrative of the compounds and processes of the present invention, but it is to be understood that the invention is not to be limited to the specific details thereof.

EXAMPLE 1

Vinyl phenylstearate was prepared by an ester interchange reaction between vinyl acetate and phenylstearic acid in the presence of a mercuric acetate-sulfuric acid catalyst according to the following equation:

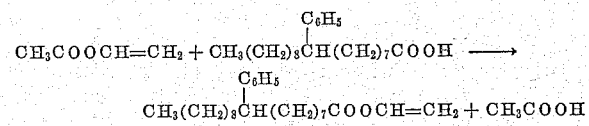

The vinyl acetate was distilled immediately before use to remove polymerization inhibitor. The phenylstearic acid was used without further purification.

To a solution of 206 g. (24 moles) of the vinyl acetate and 144 g. (0.6 mole) of the phenylstearic acid was added 1.6 g. mercuriacetate. The mixture was stirred until the mercuriacetate had dissolved. 100% sulfuric acid (0.15 ml.) and 0.1 g. copper resinate were added. All operations were conducted in an atmosphere of prepurified nitrogen. The reaction mixture was heated under reflux for three hours. Sodium acetate trihydrate (0.83 g.) was added to neutralize the sulfuric acid, and acetic acid and vinyl acetate were distilled off until the pot temperature reached 125°, leaving a 153 g. residue. An 0.5302 g. aliquot of this residue consumed 6.08 ml. of 0.0951 N sodium hydroxide by titration. The entire residue was dissolved in 1 l. of acetone and 35.4 ml. of 4.73 N NaOH was added dropwise with stirring. The mixture was chilled and filtered from the precipitated soap. The filtrate was dried over Drierite, filtered and the acetone evaporated leaving a clear yellow oil which was distilled under vacuum. A forerun of 4.5 g. boiling from 27° at 0.5 mm. to 182° at 1 mm. was collected. The main fraction (88 g., 57% yield) boiled from 182° at 1 mm. to 204° at 0.5 mm. The residue weighed 20 g. Since the vinyl ester still contained 0.091 meq./g. of free acid it was dissolved in 750 ml. acetone and 1.7 ml. of 4.73 N NaOH added. The mixture was chilled, filtered and the filtrate dried over Drierite. The oil remaining after filtration and solvent evaporation was distilled at 0.3 mm. Forerun (14.4 g.) was collected up to a temperature of 183°. The main fraction boiled from 183° to 200°, weighed 65 g. (42% yield), had $n^{22}=1.4883$ and iodine value equal to 62.5 (theory 65.5). The distillation residue weighed 4.0 g.

The method for removing residual acid comprising precipitating the sodium soap in acetone was found to be more satisfactory than the usual procedure of washing with dilute sodium bicarbonate. When the crude vinyl ester was dissolved in ether or petroleum ether and washed with 10% sodium bicarbonate solution, a large proportion of the soap was soluble in the organic solvent and caused decomposition upon attempted distillation of the vinyl ester. Decomposition also resulted when the residual acid was not removed prior to distillation. Also, any residual acid present in the vinyl ester seemed to inhibit its subsequent polymerization.

EXAMPLES 2-11

These examples represent the preparation of the vinyl chloride-vinyl phenylstearate copolymers tabulated in Table I below.

The vinyl chloride was used without further purification. The vinyl stearate was recrystallized. The distilled water for the emulsion polymerizations was boiled then cooled under prepurified nitrogen. The emulsifiers were as follows: "Tergitol" 4, the sodium sulfate derivative of 7-ethyl-2-methylundecan-4-ol, as a 25% solution; "Span" 20, sorbitan monolaurate. The initiators were prepared as a 12 g./100 ml. solution of ammonium persulfate and a 10 g./100 ml. solution of sodium bisulfite in freshly boiled distilled water. The solutions were stored under prepurified nitrogen in bottles with serum caps from which the desired volume was withdrawn with a syringe.

In order to prepare these copolymers, in each case the water, emulsifier, salt, and vinyl phenylstearate were placed in a flint glass bottle and chilled under prepurified nitrogen in a Dry Ice-acetone bath. A slight excess of liquid vinyl chloride was added, the bottle placed on a balance, and the vinyl chloride allowed to evaporate until the desired weight was reached. The emulsion recipes are presented in Table I. After evaporation of excess vinyl chloride or flushing with prepurified nitrogen the bottle was capped with a self-sealing rubber gasket and a metal screw cap in which a hole had been drilled. The bottle was placed in a steel cage and allowed to warm to room temperature. The desired amounts of initiator solutions were introduced with a syringe through the gasket. The bottle was subjected to end-over-end agitation in a launderometer in which the water bath was maintained at 49–50° C. After several hours' agitation the bottle was removed from the launderometer, cooled to room temperature and any excess vinyl chloride vented through the gasket. The contents were poured into a solution of magnesium chloride in methanol. The coagulated polymer was filtered and washed several times with distilled water to remove salts and emulsifier. Any excess vinyl phenylstearate was removed by repeated washing with petroleum ether. The polymer was dried in a vacuum dessicator before weighing and characterization.

The samples of the various vinyl chloride-vinyl phenylstearate copolymers set forth in Table I below were carefully purified, dried, and analyzed for chlorine. The vinyl chloride content and vinyl phenylstearate content was calculated from the chlorine analysis. Weighed samples were dissolved in definite volumes of tetrahydrofuran. The infrared spectra were taken against a blank of tetrahydrofuran using a Perkin-Elmer Model 21 instrument with 0.092 mm. sodium chloride cells. The absorbance at the ester peak of $5.75\mu$ was proportioned to the concentration of vinyl phenylstearate in the polymer solution. By comparison of these standard spectra with the infrared spectrum of a weighed sample of copolymer in a known amount of tetrahydrofuran the copolymer composition could be calculated, the results being set forth in Table I.

For a high polymer dissolved in a solvent $$\lim \frac{\eta_{sp}}{C} = KM^a$$

where M is molecular weight and K and $a$ are constants, characteristic of the given solute-solvent system. When C is expressed in g./100 ml. for polyvinyl chloride in cyclohexanone at 25°, $K = 1.1 \times 10^{-5}$ and $a = 1.0$ (Weissberger, A, Physical Methods of Organic Chemistry 1, pp. 145–6, Interscience Publishers, Inc., New York, 1945).

*Table 1*

EMULSION POLYMERIZATION OF VINYL PHENYLSTEARATE (VPS) AND VINYL CHLORIDE

| Ex. No. | Emulsion recipe for 30 g. monomer mixture | | | | Copolymer composition, Wt. percent VPS | | Conditions | | Yield of Co-polymer per-cent | Properties of Copolymer | | | | | | |
|---|---|---|---|---|---|---|---|---|---|---|---|---|---|---|---|---|
| | | | | | | | | | | Viscosity | | Tensile strength (p.s.i.) | Brittle point (° C.) | Softening point (° C.) | Flow point (° C.) | Decomposition temp. (° C.) |
| | Emulsifier (g.) | NaCl (g.) | Initiators (g.) | Water (g.) | As charged | In polymer | Temp. (° C.) | Time (hrs.) | | $\lim_{C \to 0} \frac{\eta_{sp}}{C}$ | Mol. wt. | | | | | |
| 2 | "Tergitol"4 (1.5) | 0.1 | (NH₄)₂S₂O₈ (0.30) NaHSO₃ (0.12) | 60 | 5.9 | 1.2 | 49–50 | 19 | ¹ 93 | 0.71 | 6.4×10⁴ | 2430±290 | −48 | 116–22 | 125–33 | 136 |
| 3 | "Tergitol"4 (1.5) | 0.2 | (NH₄)₂S₂O₈ (0.15) NaHSO₃ (0.06) | 60 | 16.1 | 4.8 | 49–50 | 22 | ² 77 | 0.44 | 4.0×10⁴ | (*) | −40 | 108–12 | 118–28 | 147 |
| 4 | "Tergitol"4 (1.5) | 0.2 | (NH₄)₂S₂O₈ (0.30) NaHSO₃ (0.12) | 60 | 16.1 | 3.9 | 49–50 | 19 | ¹ 80 | 0.68 | 6.2×10⁴ | 1820±50 | −25 | 115–21 | 132–42 | 134 |
| 5 | "Tergitol"4 (1.5) | 0.3 | (NH₄)₂S₂O₈ (0.15) NaHSO₃ (0.03) | 60 | 20.4 | 9.4 | 49–50 | 22 | ² 83 | 0.59 | 5.4×10⁴ | 2180±80 | −50 | 92–8 | 105–18 | 137 |
| 6 | "Tergitol"4 (1.5) | 0.3 | (NH₄)₂S₂O₈ (0.30) NaHSO₃ (0.12) | 60 | 20.4 | 9.0 | 49–50 | 19 | ¹ 90 | 0.61 | 5.5×10⁴ | 1620±40 | −18 | 108–14 | 129–39 | 134 |
| 7 | "Tergitol"4 (1.5) | 0.4 | (NH₄)₂S₂O₈ (0.30) NaHSO₃ (0.12) | 60 | 24.6 | 19.8 | 49–50 | 18.5 | ¹ 83 | 0.69 | 6.3×10⁴ | 2060±230 | −36 | 94–7 | 104–17 | 139 |
| 8 | "Tergitol"4 (1.5) | 0.5 | (NH₄)₂S₂O₈ (0.30) NaHSO₃ (0.12) | 60 | 28.4 | 31.2 | 49–50 | 51.5 | ²³ 77 | (*) | (*) | (*) | (*) | (*) | (*) | (*) |
| 9 | "Tergitol"4 (2.5) "Span"20 (2.5) | 0 | (NH₄)₂S₂O₈ (0.30) NaHSO₃ (0.12) | 98 | 28.4 | 18.4 | 49–50 | 20 | ¹ 97 | 0.44 | 4.0×10⁴ | 1340±40 | −14 | 63–8 | 74–84 | 117 |
| 10 | "Tergitol"4 (2.5) "Span"20 (2.5) | 0 | (NH₄)₂S₂O₈ (0.30) NaHSO₃ (0.12) | 98 | 40.3 | 20.4 | 49–50 | 20 | ¹ 77 | 0.34 | 3.1×10⁴ | 1410±70 | −19 | 57–64 | 72–85 | 131 |
| 11 | "Tergitol"4 (1.5) | 0.3 | (NH₄)₂S₂O₈ (0.30) NaHSO₃ (0.12) | 60 | ⁴ 15.0 | ND | 49–50 | 2.5 | 77 | ND | ND | 1600 | −57 | ND | ND | ND |

¹ No monomeric vinyl chloride remained upon termination of the reaction as evidenced by the absence of pressure in the polymerization vessel. Therefore the incomplete recovery of material was probably caused by losses in handling and washing.
² Monomeric vinyl chloride remained upon termination of the reaction as evidenced by pressure in the polymerization vessel.
³ Some of the material came out of emulsion during the reaction.
⁴ Vinyl phenylstearate replaced by vinyl stearate.
* Not determined.

Since our values of specific viscosity were determined not on polyvinyl chloride but on copolymers of varying composition the molecular weights calculated by this method are only estimates. However, these estimated molecular weights can be compared within the series of experiments to give the relative degree of polymerization of each polymer.

Films were prepared of the copolymers for tensile strength determination. The sample width was 0.125 in., the thickness 0.003 to 0.010 in., and the load rate 0.244 in./min. To prepare a film 5 g. copolymer was dissolved with shaking in 20 ml. cyclohexanone or tetrahydrofuran. The solution was filtered through gauze and the dissolved gases removed under slight vacuum. By means of a doctor blade an 0.06 in. layer of the solution was spread on a glass plate. The solvent was evaporated by gentle warming and the film carefully removed from the plate.

Samples of film about one inch square were suspended in a bath of Dry Ice petroleum ether in a Dewar flask. The temperature was lowered by adding more Dry Ice. When the film had been immersed in the bath at a certain temperature for one minute it was flexed rapidly. The brittle point was the highest temperature at which the film did not break. The brittle points are presented in Tables I and II. In comparison, a film prepared from "Geon" 121, a vinyl chloride polymer, had a brittle point below −78° C.

The softening point, flow point and decomposition temperature were determined on powdered samples of vinyl chloride-vinyl phenylstearic copolymers and are presented in Table I. The sample was placed on a cover glass on a melting point block. The temperature was raised at about 5° C./min. The softening point was the temperature range during which the particles fused together upon manipulation with a spatula. A second cover glass was placed over the sample and pressed with a spatula. The flow point was the temperature range during which the particles softened sufficiently to flow. The decomposition point was the temperature at which the sample darkened. "Geon" 121 had a softening point of 118–24° C., a flow point of 126–40° C., and a decomposition temperature above 170° C.

Samples of vinyl chloride-vinyl phenylstearate copolymers (Examples 3, 5, 7, 8 and 11) as films were mounted in a Fade-Ometer test mask and were exposed in a FDA–R Fade-Ometer at a black panel temperature not exceding 150° F. for 100 hours. The film samples were examined visually after each 20-hour period of exposure and were masked after 20, 40 and 60 hours' exposure. The results are presented in Table II below.

*Table II*
LIGHT STABILITY OF VINYL CHLORIDE-VINYL PHENYLSTEARATE COPOLYMERS

| Example number | Wt. percent vinyl phenyl-stearate | Hours of exposure in Fade-Ometer | | | |
|---|---|---|---|---|---|
| | | 20 | 40 | 60 | 100 |
| 3 | 4.8 | Appreciable purple discoloration | Increased purple discoloration | Excessive darkening, dark brown discoloration | Excessive darkening, dark brown discoloration |
| 5 | 9.4 | do | do | Purple discoloration "faded" to brown | Increased "fading" of the discoloration to light brown. |
| 7 | 19.8 | Appreciable darkening | Increased darkening, purple discoloration | do | Increased "fading" of the discoloration to yellow |
| 8 | 31.2 | Slight darkening | Increased darkening | Appreciable darkening | Darkening "faded" to yellow |
| 11 | 15.0 | Appreciable darkening, reddish discoloration | Considerable darkening, reddish discoloration | Considerable darkening, brown discoloration | Excessive darkening, dark brown discoloration |

EXAMPLES 12–18

These examples represent the preparation of vinyl acetate-vinyl phenylstearate copolymers tabulated in Table III below. The copolymers were prepared and charac-

*Table III*
EMULSION POLYMERIZATION OF VINYL PHENYLSTEARATE (VPS) WITH VINYL ACETATE

| Example number | Emulsion recipe for 30 g. monomer mixture | | | Copolymer composition, wt. percent VPS | | Conditions | | Yield of copolymer, percent | Properties of copolymer | | | |
|---|---|---|---|---|---|---|---|---|---|---|---|---|
| | Emulsifier (g.) | Initiator (NH$_4$)$_2$S$_2$O$_8$ (g.) | Water (g.) | As charged | In polymer | Temp. (° C.) | Time (hrs.) | | Viscosity | | Tensile strength (p.s.i.) | Brittle point (° C.) |
| | | | | | | | | | lim n$_{sp}$ C→0 C | Mol. wt. | | |
| 12 | "Nopcogen" 14L (1.2) "Triton" W-30 (1.2) | 0.3 | 59 | 8.4 | 1.0 | 50 | 49 | 91 | 1.28 | 2.9×10$^5$ | 360 | −64 |
| 13 | "Nopcogen" 14L (1.2) "Modicol" S (1.2) | 0.3 | 59 | 8.4 | 1.2 | 50 | 49 | 97 | 1.19 | 2.6×10$^5$ | 63 | −32 |
| 14 | "Nopcogen" 14L (1.2) "Triton" W-30 (1.2) | 0.3 | 59 | 13.2 | 5.7 | 50 | 46 | 92 | 0.90 | 1.7×10$^5$ | 460 | −56 |
| 15 | "Nopcogen" 14L (1.2) "Modicol" S (1.2) | 0.3 | 59 | 13.2 | 6.3 | 50 | 46 | 100 | 0.84 | 1.5×10$^5$ | 540 | −57 |
| 16 | "Nopcogen" 14L (1.2) "Triton" W-30 (1.2) | 0.3 | 59 | 15.6 | 9.6 | 50 | 43.5 | 88 | 0.97 | 1.9×10$^5$ | 330 | −55 |
| 17 | "Nopcogen" 14L (1.2) "Modicol" S (1.2) | 0.3 | 59 | 15.6 | 9.3 | 50 | 43.5 | 90 | 0.71 | 1.2×10$^5$ | 390 | −22 |
| 18 | "Nopcogen" 14L (1.2) "Triton" W-30 (1.2) | 0.3 | 59 | [1] 15 | ND | 50 | 17 | 60 | ND | ND | 1,720 | −63 |

[1] Vinyl phenylstearate replaced by vinyl stearate.    ND = Not determined.

terized in the same manner as described in connection with Examples 2–11, with the following differences: The vinyl acetate was distilled immediately before use under purified nitrogen through an 18-inch Vigreux column. The emulsifiers were as follows: "Nopcogen" 14L, a fatty amino compound, and "Modicol" S, a sulfonated fatty product; "Triton" W–30, the sodium salt of an alkyl aryl ether sulfate, and "Triton" X–200, the sodium salt of an alkyl aryl polyether sulfonate, as 25% solutions. The water, emulsifier and both monomers were placed in a pint glass bottle and flushed thoroughly with purified nitrogen. To determine the composition of the vinyl acetate-vinyl phenylstearate copolymers weighed samples were dissolved in known amounts of tetrahydrofuran and the infrared spectra determined. The absorbance of the aromatic peak at $14.28\mu$ was compared with the absorbance of solutions of various concentrations of monomeric vinyl phenylstearate in tetrahydrofuran and the composition calculated, the results being set forth in Table III.

The specific viscosities of the vinyl acetate-vinyl phenylstearate copolymers were determined in C.P. acetone at 30° C. For polyvinyl acetate in acetone at 30° C., $K=208\times10^{-4}$ and $a=0.67$.

EXAMPLES 19 AND 20

Also prepared by the emulsion method were two copolymers of methyl methacrylate and vinyl phenylstearate. The polymerization recipe was as follows: 30 g. monomer mixture, 3 g. "Triton" X–200, 6 g. "Tergitol" 4, 60 g. water, and 0.12 g. ammonium persulfate. The first polymerization (Example 19) employed 7.3% by weight of vinyl phenylstearate and a reaction time of 19 hours to give an 85% yield of polymer. In the second polymerization (Example 20) 13.9 weight percent of vinyl phenylstearate was used; the reaction time was 23 hours and the yield 88%.

Having fully described our invention, it is to be understood that we do not wish to be limited to the details set forth, but our invention is of the full scope of the appended claims.

We claim:
1. Vinyl aryl stearate wherein said aryl group is attached to said stearate group
2. Vinyl phenyl stearate wherein said phenyl group is attached to said stearate group.
3. Vinyl naphthyl stearate wherein said naphthyl group is attached to said stearate group.
4. Normally solid copolymers of vinyl chloride and vinyl aryl stearate wherein said aryl group is attached to said stearate group, said copolymers being advanced to a degree which is at least sufficient to render said copolymers capable of forming films.
5. Normally solid copolymers of vinyl chloride and vinyl phenyl stearate wherein said phenyl group is attached to said stearate group, said copolymers being advanced to a degree which is at least sufficient to render said copolymers capable of forming films.
6. Normally solid copolymers of vinyl acetate and vinyl aryl stearate wherein said aryl group is attached to said stearate group, said copolymers being advanced to a degree which is at least sufficient to render said copolymers capable of forming films.
7. Normally solid copolymers of vinyl acetate and vinyl phenyl stearate wherein said phenyl group is attached to said stearate group, said copolymers being advanced to a degree which is at least sufficient to render said copolymers capable of forming films.
8. Normally solid copolymers of methyl methacrylate and vinyl aryl stearate wherein said aryl group is attached to said stearate group, said copolymers being advanced to a degree at least sufficient to render said copolymers capable of forming films.
9. Normally solid copolymers of methyl methacrylate and vinyl phenyl stearate wherein said phenyl group is attached to said stearate group, said copolymers being advanced to a degree at least sufficient to render said copolymers capable of forming films.
10. A process for the production of novel copolymers comprising emulsion copolymerization of vinyl chloride and a vinyl aryl stearate wherein said aryl group is attached to said stearate group.
11. A process for the production of novel copolymers comprising emulsion copolymerization of vinyl chloride and a vinyl phenyl stearate wherein said phenyl group is attached to said stearate group.
12. A process for the production of novel copolymers comprising emulsion copolymerization of vinyl acetate and a vinyl aryl stearate wherein said aryl group is attached to said stearate group.
13. A process for the production of novel copolymers comprising emulsion copolymerization of vinyl acetate and a vinyl phenyl stearate wherein said phenyl group is attached to said stearate group.
14. Copolymers of vinyl chloride and vinyl aryl stearate wherein said aryl group is attached to said stearate group having a molecular weight in the range of about 50 to about 65,000.
15. Copolymers of vinyl chloride and vinyl phenyl stearate wherein said phenyl group is attached to said stearate group having a molecular weight in the range of about 50 to about 65,000.
16. Copolymers of vinyl acetate and vinyl aryl stearate wherein said aryl group is attached to said stearate group having a molecular weight in the range of about 120 to about 290,000.
17. Copolymers of vinyl acetate and vinyl phenyl stearate wherein said phenyl group is attached to said stearate group having a molecular weight in the range of about 120 to about 290,000.
18. Vinyl 9-aryl stearate.
19. Vinyl 9-phenyl stearate.
20. Normally solid copolymers of vinyl chloride and vinyl 9-aryl stearates, said copolymers being advanced to a degree at least sufficient to render said copolymers capable of forming films.
21. Normally solid copolymers of vinyl chloride and vinyl 9-phenyl stearate, said copolymers being advanced to a degree at least sufficient to render said copolymers capable of forming films.
22. Normally solid copolymers of vinyl acetate and vinyl 9-aryl stearates, said copolymers being advanced to a degree at least sufficient to render said copolymers capable of forming films.
23. Normally solid copolymers of vinyl acetate and vinyl 9-phenyl stearate, said copolymers being advanced to a degree at least sufficient to render said copolymers capable of forming films.
24. Normally solid copolymers of methyl methacrylate and vinyl 9-aryl stearates, said copolymers being advanced to a degree at least sufficient to render said copolymers capable of forming films.
25. Normally solid copolymers of methyl methacrylate and vinyl 9-phenyl stearate, said copolymers being advanced to a degree at least sufficient to render said copolymers capable of forming films.

References Cited by the Examiner
UNITED STATES PATENTS

| | | | |
|---|---|---|---|
| 2,299,862 | 10/42 | Toussaint et al. | 260—410.9 |
| 2,462,422 | 2/49 | Plambeck | 260—87.1 |
| 2,993,034 | 7/61 | Swern | 260—87.1 |
| 3,000,918 | 9/61 | Wilip et al. | 260—410.9 |

OTHER REFERENCES

The Naming and Indexing of Chemical Compounds by Chemical Abstracts, vol. 51, 1957, page 5922.

JOSEPH L. SCHOFER, *Primary Examiner.*

H. N. BURSTEIN, J. R. LIBERMAN, WILLIAM H. SHORT, *Examiners.*